United States Patent [19]

Colgate

[11] Patent Number: 4,795,003
[45] Date of Patent: Jan. 3, 1989

[54] SELF-ENERGIZING DISC BRAKES

[75] Inventor: Brian M. Colgate, Gloucestershire, England

[73] Assignee: Lucas Industries, Ltd., Birmingham, England

[21] Appl. No.: 96,370

[22] Filed: Sep. 11, 1987

[30] Foreign Application Priority Data

Sep. 11, 1986 [GB] United Kingdom ............... 8621944

[51] Int. Cl.$^4$ ............................................. F16D 55/04
[52] U.S. Cl. .................................. 188/71.4; 188/71.8;
188/72.5; 188/72.6; 188/106 F; 188/369; 188/2 D; 192/70; 192/83
[58] Field of Search .................... 188/71.4, 72.1, 72.2, 188/72.6, 71.8, 106 F, 2 D, 72.5, 369; 192/70, 83

[56] References Cited

U.S. PATENT DOCUMENTS

| | | | |
|---|---|---|---|
| 3,106,268 | 10/1963 | Christenson et al. | 188/72.6 X |
| 3,343,632 | 9/1967 | Kershner et al. | 188/71.4 |
| 4,089,392 | 5/1978 | Ostrowski | 188/71.4 |
| 4,213,519 | 7/1980 | Moser et al. | 188/71.4 |
| 4,383,593 | 5/1983 | Micke | 188/71.4 |
| 4,611,691 | 9/1986 | Gornall | 188/71.8 |

FOREIGN PATENT DOCUMENTS 2067692 7/1981 United Kingdom ............... 188/71.4

*Primary Examiner*—George E. A. Halvosa
*Attorney, Agent, or Firm*—Oldham & Oldham Co.

[57] ABSTRACT

A self-energizing disc brake of the spreading type is applied by a pair of oppositely acting hydraulic pistons which work in a common bore in the housing of the brake. One piston acts directly on an adjacent lug on a pressure plate and the other piston acts on a lug on a pressure plate through a transmission member which extends through the piston and may be coupled at its outer end to a hand-brake or similar lever.

8 Claims, 2 Drawing Sheets

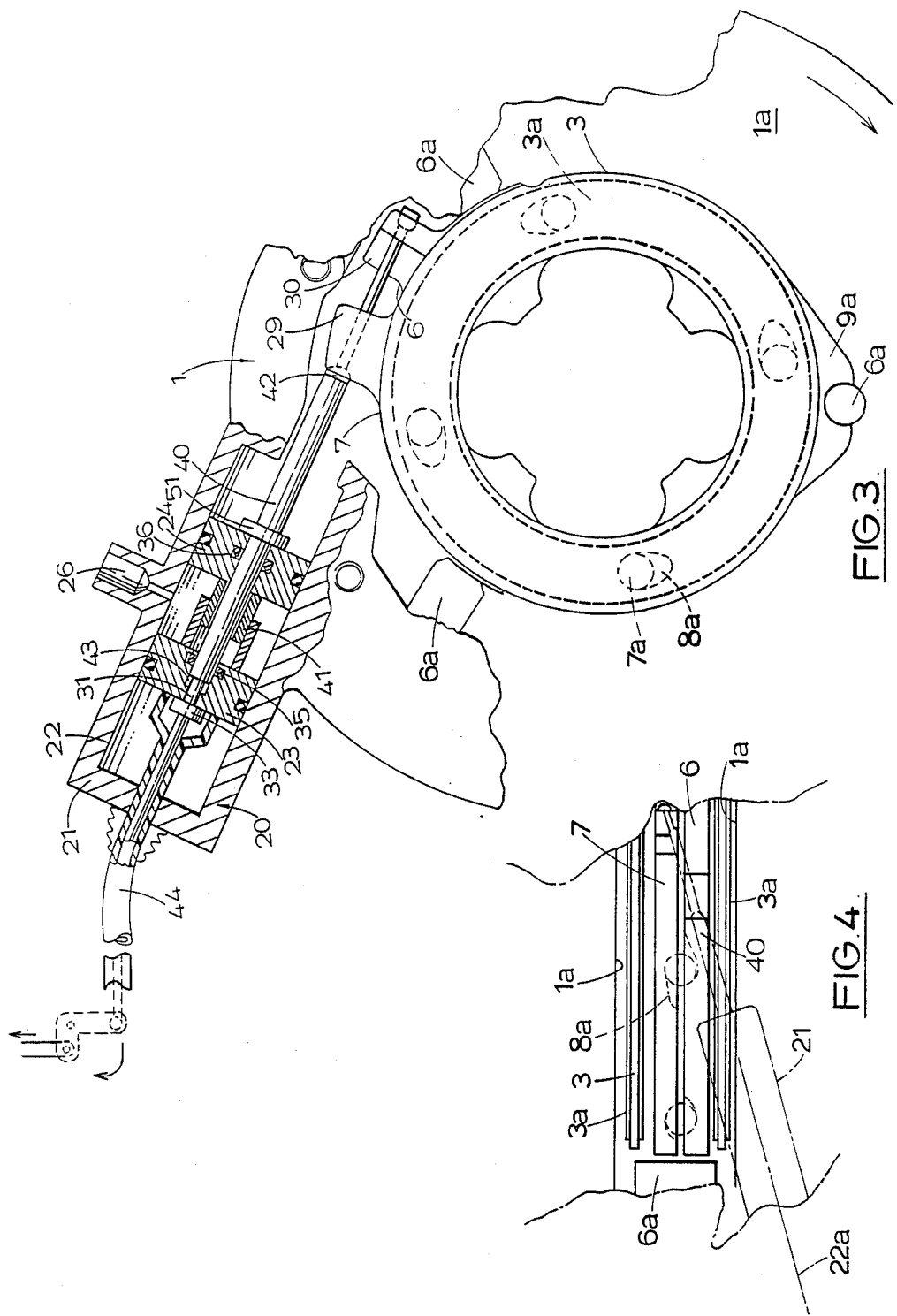

SELF-ENERGIZING DISC BRAKES

This invention relates to self-energising disc brakes of the kind in which rotatable friction discs provided with friction linings are adapted to be brought into engagement with spaced opposed braking surfaces in a housing by first and second pressure plates located between the friction discs and centred by stationary pilot lugs, application of the brake being initiated by angular movement of the pressure plates effected by operation of a brake-applying mechanism, balls or rollers being located in co-operating oppositely inclined recesses in the adjacent faces of the plates such that on operation of the brake-applying mechanism to move the pressure plates angularly in opposite directions, the engagement of the balls or rollers and the recesses causes the pressure plates to move apart into engagement with the friction discs which are urged into engagement with the braking surfaces, the pressure plates being carried round with the friction discs until one is arrested by the engagement of a lug on the plate with a drag-taking stop abutment in the housing and the continued angular movement of the other pressure plate provides a servo action.

Self-energising brakes of the kind set forth may be dry or they may be of the liquid cooled type, and such brakes are commonly used in tractors and like vehicles.

In known brakes of the kind set forth the brake-applying mechanism may comprise links which are pivotally connected to radially projecting lugs on the plates and through which a brake-applying force, for example from a pedal, is applied to the plates when a pull-rod, which is pivotally connected to the links, is moved in a radial direction. In another arrangement a cam is carried by a cam shaft which is rotatable within a radial bore in the housing, and the cam acts on the lugs on the plates through rocking thrust members or dollies which are moved relatively apart to separate the lugs in response to rotation of the cam shaft.

We are aware of G.B. No. 1 276 617 which discloses a wheel cylinder for applying a friction pad to a rotatable disc. The wheel cylinder comprises a piston for applying the pad directly to the disc for normal service braking. The cylinder incorporates an adjuster operable in combination with mechanical means for applying the brake mechanically for parking or in an emergency. The mechanical means comprises a pair of members, and balls are located in co-operating pairs of complementary recesses in adjacent faces of the members. When the members are moved angularly relative to each other by the operation of a cable assembly acting between radial arms on the members and lying in a plane parallel to the plane of the disc, this relative angular movement is accompanied by the inner member moving relatively away from the outer member and acting through the piston to apply the pad to the disc.

According to our present invention, in a self-energising disc brake of the kind set forth the brake-applying mechanism comprises a pair of oppositely acting first and second pistons, each of which acts on a respective pressure plate in order to urge the plates angularly in opposite directions to initiate application of the brake.

Conveniently both pistons are co-axially arranged with their axes tangential to the axis of the brake, and the first piston co-operates with an adjacent radial lug on one of the plates, with the second piston acting on a radial lug on the other plate through a transmission member which, in turn, passes through the first piston and through the radial lug with which the first piston co-operates.

The two pistons may work in a common bore in a housing and are movable relatively away from each other when pressurised fluid is admitted to a pressure space defined in the bore defined between adjacent ends of the two pistons.

Preferably the bore is angled with respect to the plane of the plates substantially in a direction to complement the helix motion of the balls or rollers co-operating with the ramps defined by the edges of the recesses in the plates.

The spacing between adjacent ends of the two pistons, which determines the braking clearances, may be determined by an automatic slack adjuster acting between the pistons.

The transmission member may be extended away from the pistons and may be coupled at its outer end to a lever for applying the brake manually for parking or in an emergency. In such a construction the transmission member comprises a flexible inextensible member which extends through a two-part outer flexible casing. The first casing part is in abutment at opposite ends between the adjacent radial lug and the adjacent inner piston so that it acts as a thrust member to apply a force to that lug as the flexible member is withdrawn through the casing in response to movement of the outer piston in the opposite, outwards, direction, and the second casing part has an abutment with the outer piston to apply a reaction to the said adjacent radial lug through the first casing part after a degree of lost motion has been taken up between the first casing part and the outer piston.

Two embodiments of our invention are illustrated in the accompanying drawings in which:

FIGS. 3 and 4 illustrate further features of the brake of FIG. 1.

Figure 1:
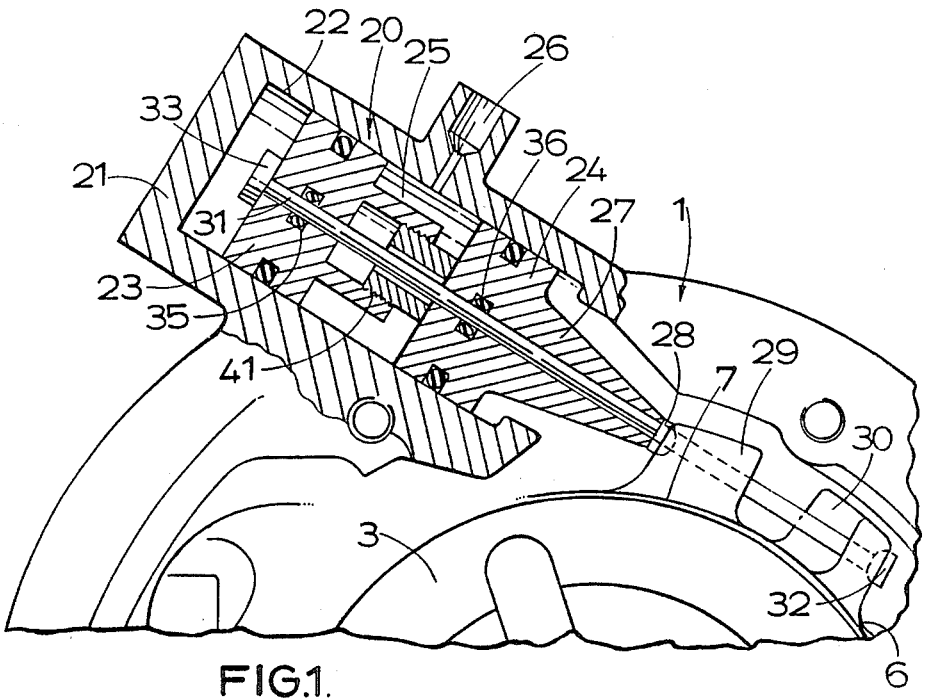
FIG. 1 is an elevation of a portion of a brake of the self-energising type including a section through the brake applying mechanism.

The self-energising disc brake illustrated in FIG. 1 and FIGS. 3 and 4 of the drawings comprises a housing 1 through which a rotatable shaft extends axially. A pair of axially spaced friction discs 3 provided on opposite sides with linings of friction material 3a are slidably splined on the shaft. The discs 3 are adapted to be brought into engagement with axially spaced radially braking surfaces 1a at opposite ends of the housing 1 by a pair of annular pressure plates 6 and 7 which are located between the discs and are centred by three stationary pilot lugs 6a on the housing 1. Balls or rollers 7a are located in angularly spaced co-operating oppositely inclined recesses in adjacent faces of the pressure plates 6 and 7.

The application of the brake is initiated by moving the pressure plates 6 and 7 angularly in opposite directions which causes the balls to tend to ride up ramps 8a formed by the walls of recesses, and the pressure plates 6, 7 then move apart into engagement with the friction discs to urge them into engagement with the radial surfaces 1a on the housing 1.

When the discs 3 are rotating in one direction, the plates 6 and 7 are carried round with the discs 3 until one plate is arrested by the engagement of a radial lug 9a on that plate with an adjacent face on a drag-taking stop abutment, conveniently defined by the adjacent end of one of the pilot lugs. Continued angular movement of the other plate provides a servo-action to increase the braking torque.

When the shaft is rotating in the opposite direction and the brake is applied, the sequence described above is repeated except that the angular movement of the other plate is arrested.

The angular movement of the plates 6, 7 to apply the brake is initiated by a brake applying mechanism 20. As illustrated the mechanism comprises a cylinder 21 integral with the housing 1 and having a bore 22 which is closed at its outer end in which works a pair of oppositely acting spaced co-axial outer and inner pistons 23, 24. A pressure space 25 defined in the bore 22 between the pistons 23 and 24 is connected to a source of hydraulic fluid under pressure, suitably a pedal-operated master cylinder, through a radial port 26. The axis 22a of the bore 22 is angled with respect to the plane of the plates 6, 7.

The inner piston 24 has a forward extension 27 which terminates in a nose 28 which acts as a radial lug 29 on the pressure plate 7 and the outer piston 23 is coupled to a radial lug 30 on the plate 6 through an inextensible flexible member, suitably a cable 31, provided at opposite ends with ferrules 32 and 33 co-operating with the outer faces of the lug 30 and of the piston 23, respectively. The cable 31 passes through seals 35 and 36 in the pistons 23 and 24.

When the pressure space 25 is pressurised, the two pistons 23 and 24 move away from each other with the result that the two lugs 29 and 30 are moved towards each other, in turn to impart a relative angular movement to the two pressure plates 6 and 7. This initiates application of the brake as described above. Since the bore 22 is angled with respect to the plane of the plates 6 and 7, the line of action of the brake-applying force complements the helix motion of the balls or rollers co-operating with the ramps defined by the walls of the recesses.

The relative retracted positions of the two pistons 23 and 24 are determined by an automatic slack adjuster 41 which acts between the pistons. The slack adjuster which may be of any convenient known is operative to determine the braking clearances in the 'off' position of brake.

Figure 2:
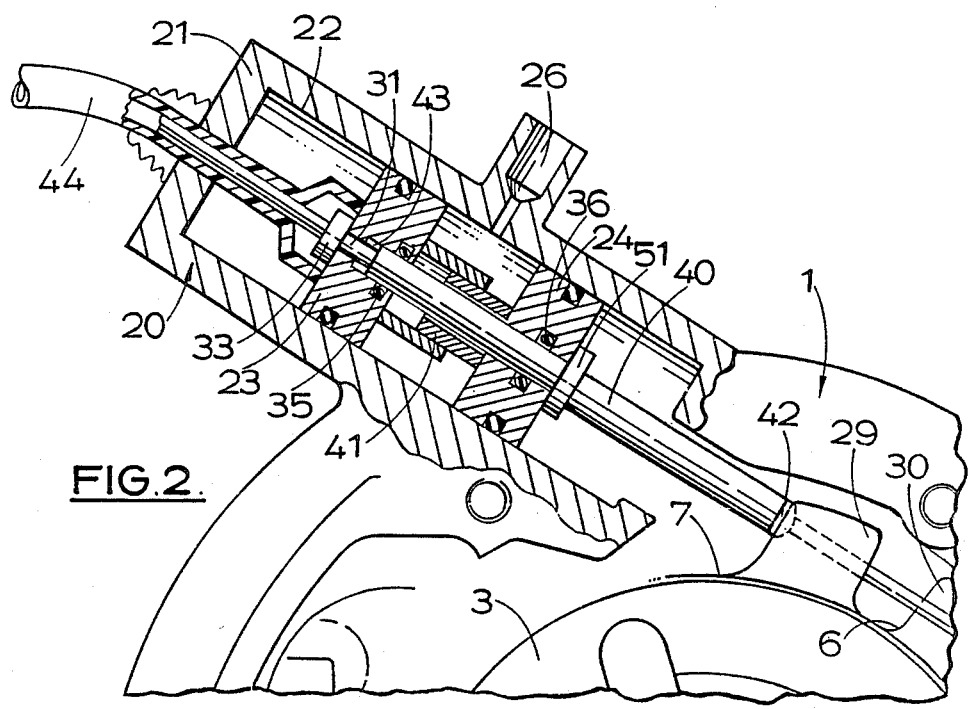
FIG. 2 is a view similar to FIG. 1 but showing a modification.

In the brake shown in FIG. 2 of the drawings the brake-applying mechanism 20 is modified to provided a hand-brake applying facility operable for parking or in an emergency.

As illustrated the extension 27 is omitted and the cable 31 is enclosed within a first casing 40 provided at an intermediate point in its length with a collar 51 for abutment with the face of the piston 24 adjacent to the lug 29, and at its inner end with a ferrule 42 for co-operation with the lug 29. The opposite end of the casing 40 is received in a counterbore 43 in the piston 23 and is normally spaced from the base of the counterbore to provide a degree of lost motion.

The cable 31 extends beyond the ferrule 33 and is encased within a second casing 44. The cable 31 is connected at its free end to a hand-brake-applying lever. The second casing 44 abuts at opposite ends between a face on the hand-brake lever and the outer face of the piston 23.

When the brake is to be applied for normal service braking, as described above the pistons 23 and 24 move away from each other with the cable 31 being withdrawn from the casing 40 which, in turn, is displaced relatively in the opposite direction and acts as a thrust member to apply a force to the lug 29.

When the brake is to be applied from the hand-lever, the cable 31 is withdrawn through the two casings 40 and 44 and the reaction applied to the casing 44 acts in the opposite direction and through the piston 23 and the casing 40. This moves the lugs 29 and 30 relatively towards each other to apply the brake as described above.

The construction and operation of the brake of FIG. 2 is otherwise the same as FIG. 1, and corresponding reference numerals have been applied to corresponding parts.

We claim:

1. A self-energising disc brake comprising a housing, first and second axially spaced braking surfaces in said housing, radial pilot lugs and a drag-taking stop abutment in said housing, first and second pressure plates centred on said pilot lugs, first and second actuator lugs provided respectively on said first and second pressure plates, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and brake-applying means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried round with said discs until one of said plates is arrested by the engagement of a lug on that plate with said drag-taking stop abutment, whereafter continued angular movement of the other of said plates provides a servo action, said brake-applying mechanism comprising a pair of oppositely acting first and second pistons, each of which acts on a respective pressure plate in order to urge said plates angularly in opposite directions to initiate application of said brake, wherein said pistons are co-axially arranged with their axes tangential to the axis of said brake, and said first piston co-operates with an adjacent radial lug on one of said plates with said second piston acting on a radial lug on the other of said plates through a transmission member which, in turn, passes through said first piston and through said radial lug with which said first piston co-operates.

2. A disc brake according to claim 1, wherein said two pistons work in a common bore in a housing and are movable relatively away from each other when pressurised fluid is admitted to a pressure space defined in said bore between adjacent ends of said two pistons.

3. A disc brake according to claim 2 wherein said bore is angled with respect to the plane of said two plates substantially in a direction to complement a helix motion of said rolling bodies co-operating with said ramps defined by said edges or the recesses in said plates.

4. A disc brake according to claim 3, wherein the spacing between adjacent ends of said two pistons which determines the braking clearances, is determined by an automatic slack adjuster acting between said pistons.

5. A disc brake according to claim 4, wherein said transmission member is extended away from said pistons and is coupled at its outer end to a lever for applying said brake manually for parking or in an emergency.

6. A disc brake according to claim 5, wherein said transmission member comprises a flexible inextensible member which extends through a two-part outer flexible casing comprising a first casing part and a second casing part.

7. A disc brake according to claim 6, wherein said first casing part is in abutment at opposite ends between said adjacent radial lug and said first piston so that it acts as a thrust member to apply a force to said adjacent radial lug as said flexible member is withdrawn through said casing in response to movement of said second piston in the opposite, outwards, direction.

8. A disc brake according to claim 6, wherein said second casing part has an abutment with the second piston to apply a reaction to the said adjacent radial lug through the first casing part and after a degree of lost-motion has been taken up between said first part of said casing and said second piston.

* * * * *